(12) United States Patent
Kino et al.

(10) Patent No.: US 6,892,698 B2
(45) Date of Patent: May 17, 2005

(54) THROTTLE CONTROL HEAT DISSIPATION DEVICE

(75) Inventors: Hisashi Kino, Aichi-ken (JP); Shinji Kawai, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 10/680,424

(22) Filed: Oct. 8, 2003

(65) Prior Publication Data

US 2004/0103882 A1 Jun. 3, 2004

(30) Foreign Application Priority Data

Oct. 9, 2002 (JP) ........................................ 2002-296637

(51) Int. Cl.[7] .............................................. F02D 9/08
(52) U.S. Cl. ...................................... 123/337; 123/403
(58) Field of Search ................................ 123/399, 337, 123/319, 403

(56) References Cited

U.S. PATENT DOCUMENTS 6,505,643 B2 * 1/2003 Scholten et al. ............ 137/554
6,646,395 B2 * 11/2003 Reimann ..................... 318/254

FOREIGN PATENT DOCUMENTS

| JP | 11187604 | 7/1999 |
|----|----------|--------|
| JP | 2001132495 | 5/2001 |

* cited by examiner

Primary Examiner—Bibhu Mohanty
(74) Attorney, Agent, or Firm—Dennison, Schultz, Dougherty & MacDonald

(57) ABSTRACT

A throttle control device includes a throttle body (1). In the throttle body, an intake passage (1a), a first space (24a), and a second space (44) are formed. In the intake passage, a throttle valve (2) is rotatably arranged. The throttle valve is rotated by a motor (4). The motor is accommodated in the first space. The second space communicates with the first space. In addition, the second space is adjacent to the intake passage through the intermediation of a wall portion (20a). This makes it possible for the heat generated in the motor to be effectively dissipated from the first space into the intake passage via the second space and the wall portion.

29 Claims, 5 Drawing Sheets

# THROTTLE CONTROL HEAT DISSIPATION DEVICE

This application claims priority to Japanese application serial Number 2002-296637, which application is hereby incorporated by reference herein in its entirety.

BACKGROUND OF THE INVENTION

1. Field of the Invention

The present invention relates to a throttle control device equipped with a throttle valve for controlling a flow rate of a fluid, in particular, to a throttle control device for controlling the flow rate of air, for example, intake air to be supplied to an automotive engine.

2. Description of the Related Art

Japanese Laid-Open Patent Publication No. 2001-132495 discloses a conventional throttle control device. In the throttle control device disclosed, a throttle valve arranged in an intake passage formed in a throttle body is rotated by a motor. Due to the rotation of the throttle valve, the intake passage is incrementally opened and closed to thereby control the intake air amount. The throttle body is equipped with a bore portion forming the intake passage and a motor housing having a motor accommodating space for accommodating the motor. Pages 3 and 4 and FIG. 1 of the above-mentioned publication are to be referred to.

In the conventional throttle control device, the motor accommodating space in the motor housing of the throttle body is barely large enough to accommodate the motor, with a small gap being left therebetween. Thus, the heat generated from the motor is mainly dissipated by utilizing the heat conductivity of a material forming the throttle body. Thus, when the material forming throttle body is of a low heat conductivity type of material, such as a resin material, there is a concern that the dissipation of the heat generated by the motor is being impaired.

SUMMARY OF THE INVENTION

It is accordingly an object of the present invention to provide a throttle control device capable of achieving an improvement in terms of the dissipation of the heat generated from the motor.

According to the present invention, a throttle control device has a throttle body, in which there are formed an intake passage, a first space, and a second space. Within the intake passage, a throttle valve is rotatably arranged. The throttle valve is rotated by a motor, which is accommodated in the first space. The first space constitutes a motor accommodating space. The second space communicates with the first space. Further, the second space is adjacent to the intake passage through the intermediation of a wall portion, making it possible for the heat generated in the motor to be dissipated into the intake passage by way of the second space and the wall portion. The second space constitutes a heat dissipation space.

Incidentally, as intake air flows through the intake passage, heat is taken away from the wall of the intake passage including the wall portion mentioned above. Therefore, the heat generated in the motor is transmitted to the wall portion by way of the second space, and is dissipated into the intake passage by utilizing the flow of the intake air. As a result, it is possible to achieve an improvement in terms of the dissipation of the heat generated in the motor.

It is desirable for the wall portion to be situated in close vicinity to the throttle valve. In particular, it is desirable for the wall portion to include a part in close vicinity to or in contact with the outer peripheral edge of the throttle valve when the throttle valve is in a fully closed position. In the vicinity of the throttle valve, the flow velocity of the intake air flowing through the intake passage is high due to the constriction of the throttle valve, so that a relatively high amount of heat is taken away from the wall portion, making it possible to efficiently dissipate the heat generated from the motor.

The throttle body has a main body forming the intake passage, and a motor housing forming the first space, and it is desirable for the wall portion to constitute a section of the main body. In this case, it is desirable for the second space to be formed inside the motor housing in order to help simplify the device structure.

Further, it is desirable for the throttle control device to further include a throttle shaft to which the throttle valve is mounted, and it is desirable for the main body to have bearing portions rotatably supporting the throttle shaft, with an outer surface of one of the bearing portions constituting a part of a wall surface of the second space.

In addition, it is desirable for the main body and the motor housing to be formed as an integral unit made, for example, of resin.

Also, it is advantageous for the second space to communicate with the first space on the side opposed to the wall surface defined by a part of the main body. Such arrangement makes it possible to efficiently guide the heat generated from the motor to the wall portion.

It is also additionally advantageous for the second space to directly face the outer surface of the motor. Such an arrangement enables the heat generated from the motor to be directly transmitted to the second space, thereby achieving an improvement in terms of heat dissipation efficiency.

BRIEF DESCRIPTION OF THE DRAWINGS

Additional objects, features and advantages of the present invention will be readily understood after reading the following detailed description together with the claims and the accompanying drawings, in which:

DESCRIPTION OF THE PREFERRED EMBODIMENT

A throttle control device according to an embodiment of the present invention will be described with reference to the drawings. First, the throttle control device will be described in general. The throttle control device of this embodiment is formed as an electronic-control type throttle control device for controlling the throttle valve opening in response to signals from an engine control unit (ECU) of an automobile (not shown), including, but not limited to signals such as an acceleration signal related to an accelerator pedal depression amount, a traction control signal, a constant-speed traveling signal such as from a cruise control device, and an idling speed control signal.

Figure 1:
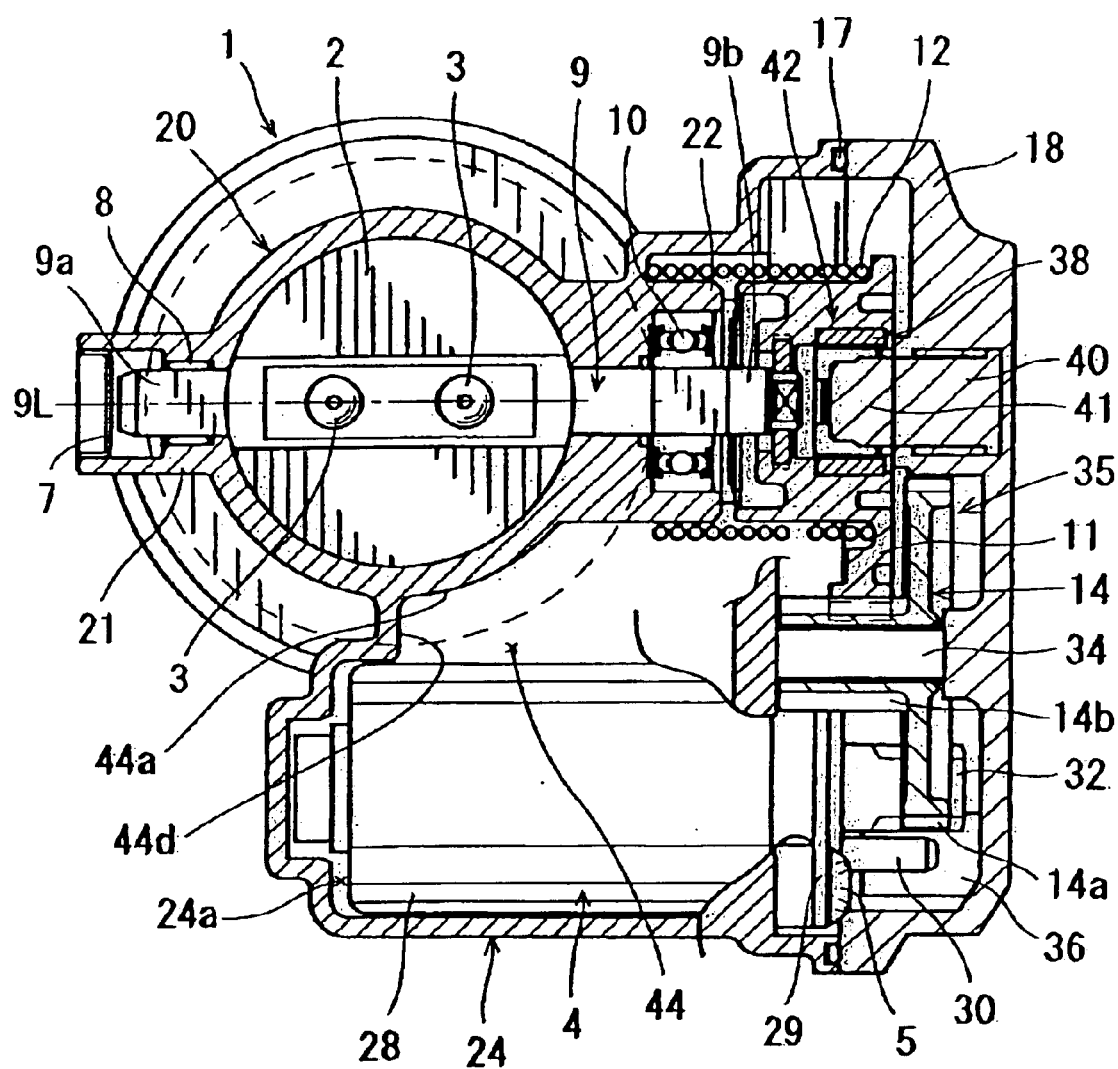
FIG. 1 is a cross-sectional view of a throttle control device according to an embodiment of the present invention.
Figure 2:
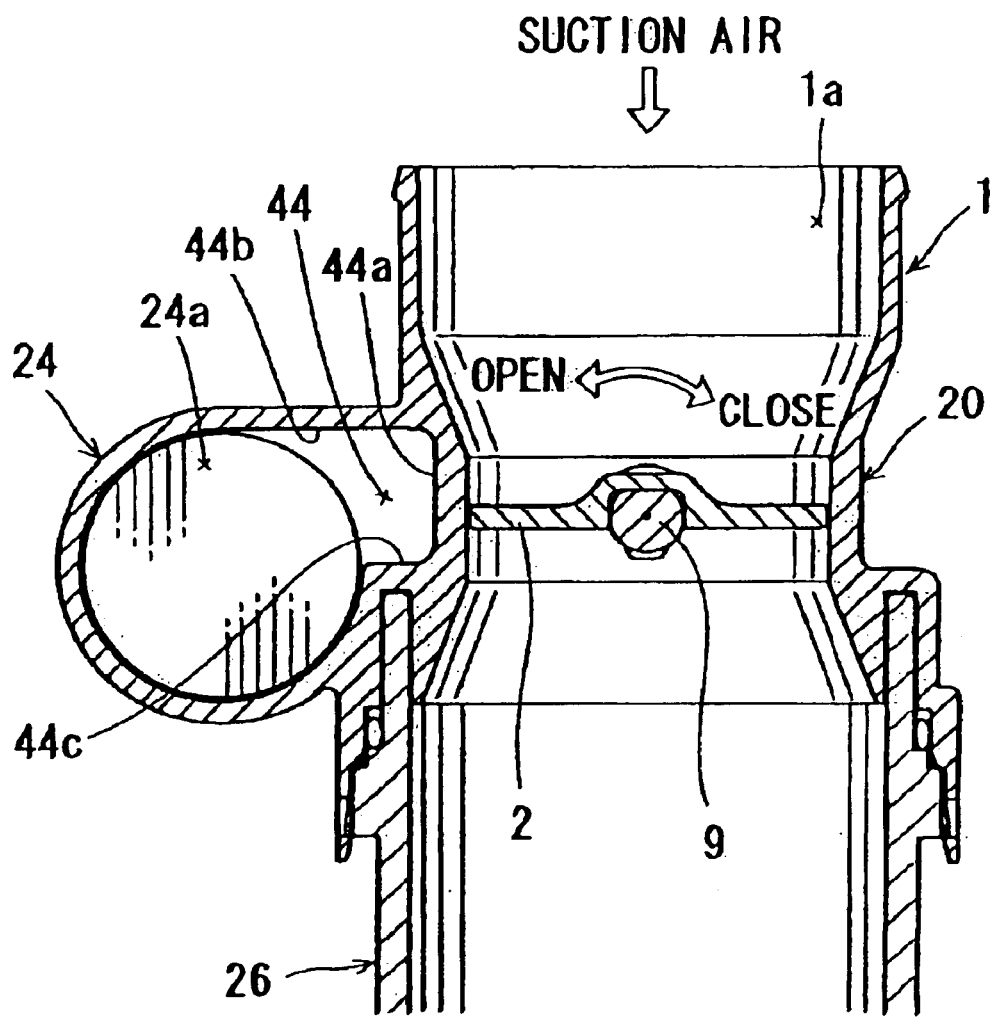
FIG. 2 is a vertical sectional view of the throttle control device of FIG. 1.

Referring to FIGS. 1 and 2, the throttle control device of this embodiment is equipped with a throttle body 1. The throttle body 1 is equipped with a main body portion 20 and a motor housing portion 24, which may be formed as an integral unit using resin. As shown in FIG. 2, formed in the main body portion 20 is a substantially cylindrical intake passage 1a extending vertically as viewed in the FIG. 2. Further, in FIG. 2, an air cleaner (not shown) is connected to an upper portion of the main body portion 20, and an intake manifold 26 is connected to a lower portion thereof.

In the main body portion 20, there is mounted a metal throttle shaft 9 radially extending across the intake passage 1a (See FIG. 1). As shown in FIG. 1, bearing portions 21 and 22 through the intermediation of bearings 8 and 10 rotatably supports end portions 9a and 9b, respectively, of the throttle shaft 9. A throttle valve 2, made of resin for example, is fixed to the throttle shaft 9, possibly by means of a plurality of rivets 3 as shown. The throttle valve 2, which is situated inside the intake passage 1a, rotates so as to close the intake passage 1a as the throttle shaft 9 rotates in one direction, and rotates so as to open the intake passage 1a as the throttle shaft 9 rotates in the other direction. These incremental opening and closing movements of the throttle valve 2 controls the amount of intake air flowing through the intake passage 1a. In FIG. 2, the throttle valve 2 is in a fully closed position. When the throttle valve in the fully closed position is rotated counterclockwise, as viewed in FIG. 2, the intake passage 1a is opened.

A plug 7 for confining the end portion 9a within the main body portion 20 is fitted into the bearing portion 21. Bearing portion 21 supports one end portion 9a (the left-hand end as seen in FIG. 1) of the throttle shaft 9. The other end portion 9b (the right-hand end as seen in FIG. 1) of the throttle shaft 9 extends through the bearing portion 22 and protrudes further to the right. A throttle gear 11 consisting of a sector gear is fixed to the protruding end of this end portion 9b so as not to allow relative rotation. A spring force, such as a torsion coil spring 12, is provided between the outer peripheral portion of the bearing portion 22 of the throttle body 1 and the outer peripheral portion of the throttle gear 11. This torsion coil spring 12 always urges the throttle valve 2 so as to close it through the throttle gear 11 and the throttle shaft 9. Further, although not shown, provided between the throttle body 1 and the throttle gear 11 is a stopper for preventing the throttle valve 2 from rotating in the closing direction beyond the fully closed position.

As shown in FIG. 1, the motor housing portion 24 of the throttle body 1 is formed in a cylindrical configuration having an axis substantially parallel with an axis 9L of the throttle shaft 9. One axial end (the left-hand end as seen in the drawing) of the motor housing 24 is closed. The interior of the motor housing portion 24 defines a space 24a open on the right-hand side of the throttle body 1. The space 24a accommodates a motor 4 that may be, for example, a DC motor. In the accommodation state as shown, the axis of the motor 4 extends parallel to the axis 9L of the throttle shaft 9. An output shaft 4a (See FIG. 3) of the motor 4 is positioned to the right, as seen in FIG. 1. The motor 4 has a motor casing 28 that defines an outer surface of the motor 4. Provided on the right-hand side of the motor casing 28 is a mounting flange 29, which is fastened to the motor housing portion 24, preferably by means of a plurality of screws 5 (See FIG. 3).

Figure 3:
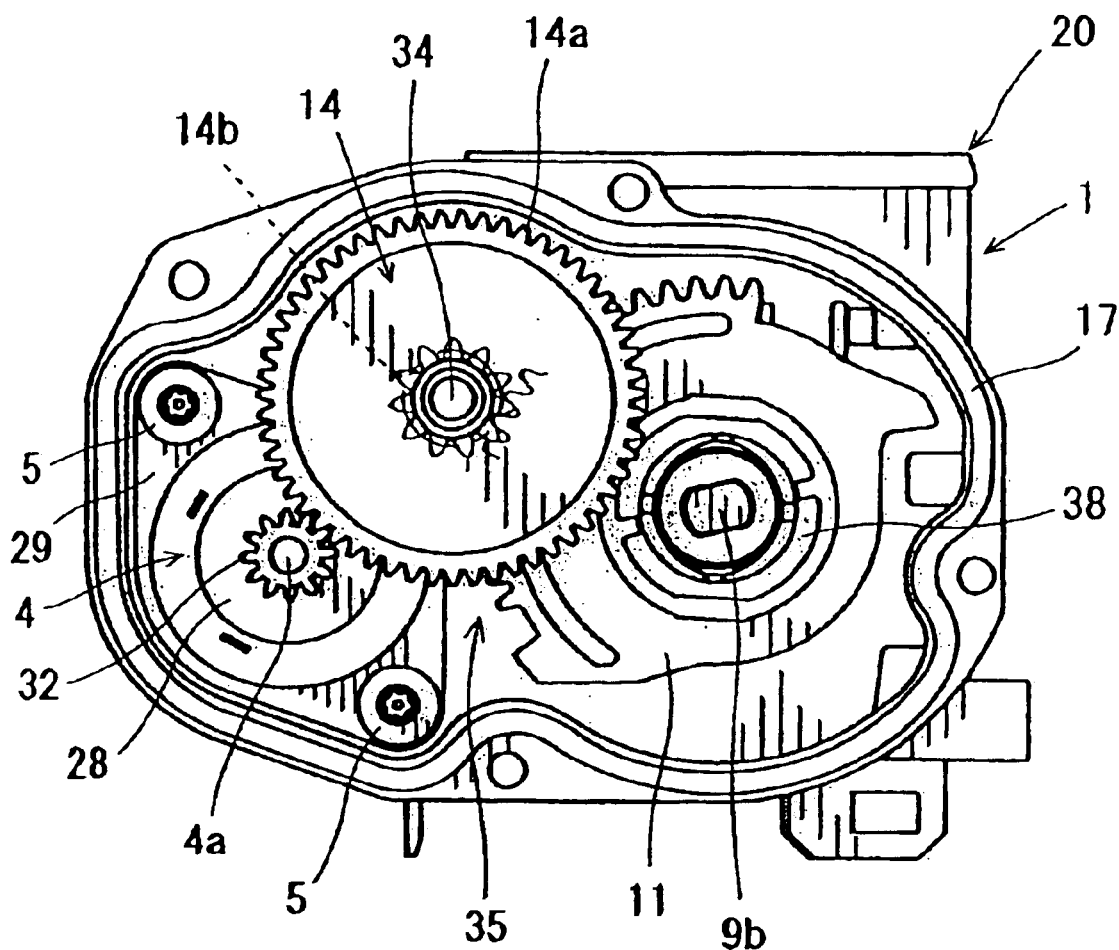
FIG. 3 is a side view of the throttle control device, with its cover removed.

The output shaft 4a of the motor 4 protrudes to the right as seen in FIG. 1 beyond the mounting flange 29, and a motor pinion 32 is fastened to this protruding portion (See FIG. 3). Further, as shown in FIG. 1, a counter shaft 34 is mounted to the throttle body 1 at a position between the main body portion 20 and the motor housing portion 24. The counter shaft 34 extends parallel to the axis 9L of the throttle shaft 9. A counter gear 14 is rotatably mounted to the counter shaft 34. The counter gear 14 has two gear portions 14a and 14b having different gear diameters. The large diameter gear portion 14a is in mesh with the motor pinion 32, and the small diameter gear portion 14b is in mesh with the throttle gear 11 (See FIG. 1). The motor pinion 32, the counter gear 14, and the throttle gear 11 constitute a speed reduction gear mechanism 35.

As shown in FIG. 1, a cover 18 mainly covering the speed reduction gear mechanism 35 is connected to the right-hand side surface of the throttle body 1 by a coupling means (not shown), for example, a coupling means may include a snap-fitting means, screw means, or clamp means, among others. Between the right-hand side surface of the throttle body 1 and the cover 18, there is provided an O-ring 17 to maintain these components in a sealed state. Further, the motor 4 has a motor terminal 30 protruding from the mounting flange 29, and this motor terminal 30 is electrically connected to a battery (not shown) and, further, to the ECU by way of a relay terminal (not shown) of a relay connector 36 provided in the cover 18. Thus, the motor 4 is driven in accordance with an acceleration signal related to accelerator pedal depression amount, a traction control signal, a constant-speed traveling signal, and an idling speed control signal, etc. The driving force of the motor 4 is transmitted to the throttle shaft 9 through the speed reduction gear mechanism 35, that is, through the motor pinion 32, the counter gear 14, and the throttle gear 11.

A ring-shaped magnet 38 is provided on the right-hand side surface of the throttle gear 11. This magnet 38 has a pair of semi-arcuate magnet segments exhibiting different polarities. Inside the cover 18, there is mounted a circuit board 40 opposed to the end surface of the throttle shaft 9. Mounted on the circuit board 40 is a Hall effect element 41 situated inside the magnet 38. When the throttle gear 11 rotates with the throttle shaft 9, the Hall element 41 detects a change in the magnetic field due to the magnet 38, and generates a Hall voltage. The Hall voltage generated by the Hall element 41 is input to the ECU by way of the circuit board 40 and the connector (not shown) provided in the cover 18. The ECU determines the throttle opening according to the change in the magnetic field of the magnet 38 as a magnetic physical quantity, and performs various control operations, such as fuel injection control, correction control on the opening of the throttle valve 2, and gear change control for automatic transmission, according to the vehicle speed detected by a vehicle speed sensor (not shown), etc. The magnet 38, the circuit board 40, and the Hall element 41 constitute a throttle sensor 42.

In the above-described throttle control device, when the engine is started, drive control is performed on the motor 4 based on a signal from the ECU, whereby, as described above, the throttle valve 2 is opened or closed through the speed reduction gear mechanism 35, with the result that the amount of intake air flowing through the intake passage 1a of the throttle body 1 is controlled.

The throttle control device of this embodiment will be further described. As shown in FIGS. 1 and 2, a heat dissipation space 44 is formed in the throttle body 1, in this embodiment the forming is performed by a machining process but also possible to be formed by other well known processes, including but not limited to the use of casting techniques, removable or sacrificial cores, multiple component parts, and other optimizing or lightening procedures.

This heat dissipation space 44 is open to the motor accommodating space 24a of the motor housing portion 24, and has an innermost wall surface 44a adjacent to the main body portion 20. The heat dissipation space 44, which is defined by the innermost wall surface 44a, an upper wall surface 44b (See FIG. 2), a lower wall surface 44c (See FIG. 2), and a left-hand wall surface 44d (See FIG. 1), is recessed with respect to the motor accommodating space 24a. Further, the heat dissipation space 44 is open to the motor accommodating space 24a, and open to the exterior through the right-hand side of the throttle body 1.

Figure 4:
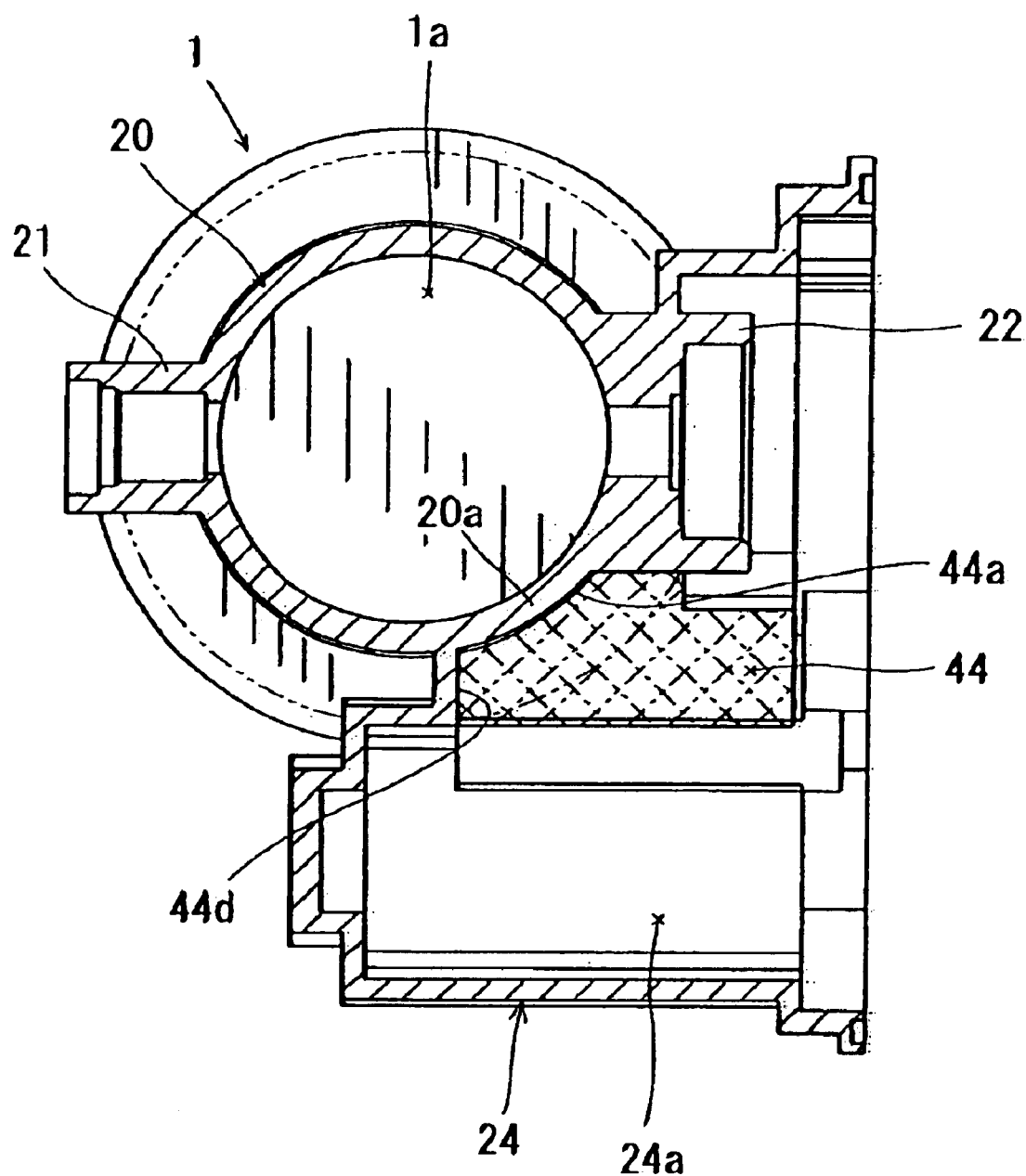
FIG. 4 is a cross-sectional view of the throttle control device, showing the throttle body in isolation.
Figure 5:
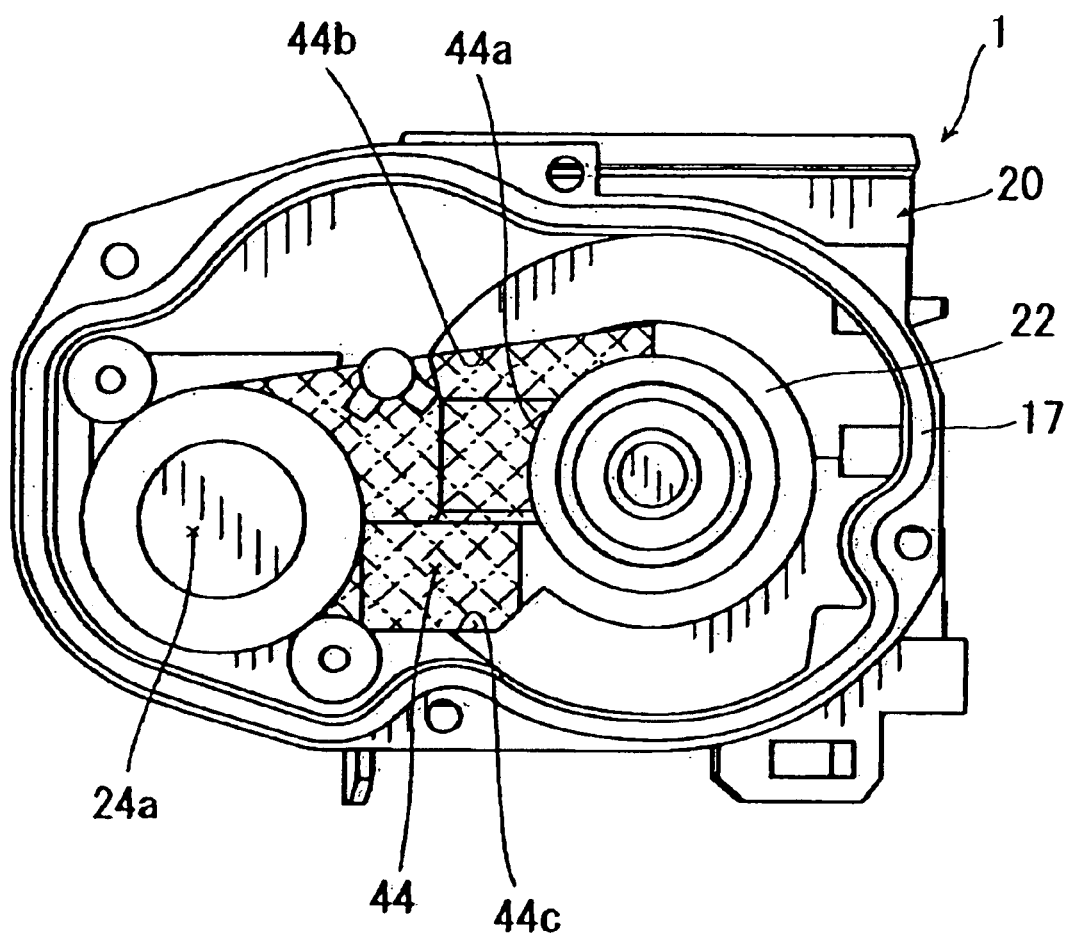
FIG. 5 is a side view showing the throttle body in isolation.

In FIGS. 4 and 5, shading using two-dot chain lines indicates the heat dissipation space 44 formed by performing a machining process on the throttle body 1. Each of the wall surfaces 44a, 44b, 44c, and 44d of the heat dissipation space 44 is formed, not necessarily as a flat surface, but in a complicated configuration with recesses and protrusions which follows an optimized lightening machine process. That is, as shown in FIGS. 4 and 5, the innermost wall surface 44a of the heat dissipation space 44 is formed so as to extend along the peripheral wall portion 20a (See FIG. 4) of the main body portion 20 as well as along the bearing portion 22 (See FIG. 5). Further, a part of the upper wall surface 44b extends substantially tangentially from the top of motor accommodating space 24 (See FIG. 2). Further, in the vicinity of the right-hand side surface (as defined in FIG. 1) of the throttle body 1, the upper wall surface 44b extends from the top portion of the motor accommodating space 24a to the top portion of the bearing portion 22 (See FIG. 5). A part of the lower wall surface 44c of the heat dissipation space 44 extends substantially parallel to the upper wall surface 44b from the middle portion, with respect to the vertical direction, of the motor accommodating space 24a (See FIG. 2). In the vicinity of the right-hand side surface of the throttle body 1, the lower wall surface 44c extends horizontally from the lower portion of the motor accommodating space 24a to the proximity of the bearing portion 22 (See FIG. 5). Further, the left-hand wall surface 44d of the heat dissipation space 44 extends from approximately the middle portion with respect to the horizontal direction of the main body portion 20 toward the motor accommodating space 24a (See FIG. 4).

In the above-described throttle control device, the throttle body 1 has the heat dissipation space 44 open to the motor accommodating space 24a accommodating the motor 4. Additionally, the heat dissipation space 44 has the innermost wall surface 44a adjacent to the body portion 20 forming the intake passage 1a (See FIGS. 1 and 2). Intake air from an air cleaner (not shown), which flows through the intake passage 1a to the intake manifold 26 (See FIG. 2), takes heat away from the main body portion 20, which includes portion 20a. Thus, the heat generated by driving the motor 4 is directly transmitted to the main body portion 20 by way of the heat dissipation space 44, and this heat is dissipated from the main body portion 20 to the intake air flowing through the intake passage 1a. As a result it is possible to achieve an improvement in terms of dissipation of the heat generated by the motor 4. This proves effective when the throttle body 1 is formed of a material of low heat conductivity, such as a resin material for example. This also proves effective when the main body portion 20 of the throttle body 1 and the motor housing portion 24 are spaced apart from each other.

Further, the heat generated by the motor 4 is directly transmitted to the body portion 20 of the throttle body 1 through the heat dissipation space 44, so that the body portion 20 is heated. Thus, it is possible to take measures against icing of the throttle valve 2 without the necessity of providing the throttle body 1 with any warm water piping utilizing engine coolant fluid. As a result, the number of parts needed for anti-icing measures is reduced, thereby achieving an additional effect of a reduction in cost, compared to traditional anti-icing methods.

Further, in this embodiment, the innermost wall surface 44a of the heat dissipation space 44 (See FIG. 2) is adjacent to the portion of the main body portion 20 which is in close proximity to or in contact with one edge portion of the throttle valve 20 when in the fully closed position. Thus, by utilizing the rapid flow of intake air through the intake passage 1a, it is possible to effectively dissipate the heat generated from the motor 4. Further, it is also possible to effectively take measures against icing as mentioned above.

The present invention is not restricted to the above-described embodiment but covers various modifications and variations of this embodiment. For example, while in the above-described embodiment the throttle body 1 and the throttle valve 2 are made of resin, it is also possible for them to be formed of some other material, such as metal. Further, the construction of the throttle sensor 42 and/or the speed reduction gear mechanism 35 is not restricted to the one described above. It is possible to adopt various other constructions therefor.

What is claimed is:

1. A throttle control device comprising:

a throttle body;

an intake passage, a first space, and a second space, defined in the throttle body;

a throttle valve rotatably arranged within the intake passage; and a motor arranged and constructed to rotate the throttle valve, the motor being accommodated in the first space, wherein the motor has a lateral surface, and the second space communicates with the first space in a position opposing an outer side surface of the motor so that the second space opposes the lateral surface of the motor, and the second space is adjacent to the intake passage through a wall portion so that heat generated in the motor is dissipated into the intake passage via the second space and the wall portion.

2. A throttle control device according to claim 1, wherein the wall portion is situated in close vicinity to the throttle valve.

3. A throttle control device according to claim 2, wherein the wall portion includes a section in close vicinity to or in contact with an outer peripheral edge of the throttle valve when the throttle valve is in a fully closed position.

4. A throttle control device according to claim 1, wherein the throttle body has a main body forming the intake passage, and a motor housing forming the first space, and wherein the wall portion constitutes a part of the main body.

5. A throttle control device according to claim 3, wherein the second space is formed inside the motor housing.

6. A throttle control device according to claim 3, wherein the throttle control device further includes a throttle shaft to which the throttle valve is mounted, and the main body has bearing portions rotatably supporting the throttle shaft, with an outer surface of one of the bearing portions constituting a part of a wall surface of the second space.

7. A throttle control device according to claim 4, wherein the throttle control device further includes a throttle shaft to which the throttle valve is mounted, and the main body has bearing portions rotatably supporting the throttle shaft, with an outer surface of one of the bearing portions constituting a part of a wall surface of the second space.

8. A throttle control device according to claim 5, wherein the throttle control device further includes a throttle shaft to which the throttle valve is mounted, and the main body has bearing portions rotatably supporting the throttle shaft, with an outer surface of one of the bearing portions constituting a part of a wall surface of the second space.

9. A throttle control device comprising:

a throttle body;

an intake passage, a first space, and a second space, defined in the throttle body;

a throttle valve rotatably arranged within the intake passage; and a motor arranged and constructed to rotate the throttle valve, the motor being accommodated in the first space, wherein the motor has a lateral surface, and the second space communicates with the first space in a position opposing an outer side surface of the motor so that the second space opposes the lateral surface of the motor and the second space is adjacent to the intake passage through a wall portion so that heat generated in the motor is dissipated into the intake passage by way of the second space and the wall portion, wherein the wall portion is formed integrally with the throttle body.

10. A throttle control device according to claim 9, wherein the wall portion is situated in close vicinity to the throttle valve.

11. A throttle control device according to claim 10, wherein the wall portion includes a section in close vicinity to or in contact with an outer peripheral edge of the throttle valve when the throttle valve is in a fully closed position.

12. A throttle control device according to claim 9, wherein the throttle body has a main body forming the intake passage, and a motor housing forming the first space, and wherein the wall portion constitutes a part of the main body.

13. A throttle control device according to claim 11, wherein the second space is formed inside the motor housing.

14. A throttle control device according claim 11, wherein the throttle control device further includes a throttle shaft to which the throttle valve is mounted, and the main body has bearing portions rotatably supporting the throttle shaft, with an outer surface of one of the bearing portions constituting a part of a wall surface of the second space.

15. A throttle control device according claim 12, wherein the throttle control device further includes a throttle shaft to which the throttle valve is mounted, and the main body has bearing portions rotatably supporting the throttle shaft, with an outer surface of one of the bearing portions constituting a part of a wall surface of the second space.

16. A throttle control device according claim 13, wherein the throttle control device further includes a throttle shaft to which the throttle valve is mounted, and the main body has bearing portions rotatably supporting the throttle shaft, with an outer surface of one of the bearing portions constituting a part of a wall surface of the second space.

17. A throttle control device comprising:

a throttle body;

an intake passage, a first space, and a second space, defined in the throttle body;

a throttle valve rotatably arranged within the intake passage; and a motor arranged and constructed to rotate the throttle valve, the motor being accommodated in the first space, wherein the motor has a lateral surface, and the second space communicates with the first space in a position opposing an outer side surface of the motor so that the second space opposes the lateral surface of the motor, and the second space is adjacent to the intake passage through a wall portion so that heat generated in the motor is dissipated into the intake passage via the second space and the wall portion, wherein the second space directly faces an outer surface of the motor.

18. A throttle control device according to claim 17, wherein the wall portion is situated in close vicinity to the throttle valve.

19. A throttle control device according to claim 18, wherein the wall portion includes a section in close vicinity to or in contact with an outer peripheral edge of the throttle valve when the throttle valve is in a fully closed position.

20. A throttle control device according to claim 17, wherein the throttle body has a main body forming the intake passage, and a motor housing forming the first space, and wherein the wall portion constitutes a part of the main body.

21. A throttle control device according to claim 19, wherein the second space is formed inside the motor housing.

22. A throttle control device according claim 19, wherein the throttle control device further includes a throttle shaft to which the throttle valve is mounted, and the main body has bearing portions rotatably supporting the throttle shaft, with an outer surface of one of the bearing portions constituting a part of a wall surface of the second space.

23. A throttle control device according claim 20, wherein the throttle control device further includes a throttle shaft to which the throttle valve is mounted, and the main body has bearing portions rotatably supporting the throttle shaft, with an outer surface of one of the bearing portions constituting a part of a wall surface of the second space.

24. A throttle control device according claim 21, wherein the throttle control device further includes a throttle shaft to which the throttle valve is mounted, and the main body has bearing portions rotatably supporting the throttle shaft, with an outer surface of one of the bearing portions constituting a part of a wall surface of the second space.

25. A throttle control device according to claim 20, wherein the main body and the motor housing are formed integrally with each other.

26. A throttle control device according to claim 21, wherein the main body and the motor housing are formed integrally with each other.

27. A throttle control device according to claim 22, wherein the main body and the motor housing are formed integrally with each other.

28. A throttle control device according to claim 23, wherein the main body and the motor housing are formed integrally with each other.

29. A throttle control device according to claim 24, wherein the main body and the motor housing are formed integrally with each other.

* * * * *